[11] 3,854,960
[45] Dec. 17, 1974

[54] ANTI-FOULING PAINTS

[75] Inventors: Hans Plum, Heessen; Friedrich Runggas, Dortmund; Manfred Von Haaren, Unna-Afferde; Horst Krase, Kamen, all of Germany

[73] Assignee: Schering AG, Berlin & Bergkamen, Germany

[22] Filed: Aug. 13, 1973

[21] Appl. No.: 387,589

[30] Foreign Application Priority Data

Aug. 17, 1972 Germany............................ 2240487

[52] U.S. Cl............. 106/15 AF, 260/37 EP, 260/42
[51] Int. Cl............................................... C09d 5/16
[58] Field of Search................................ 106/15 AF

[56] References Cited

UNITED STATES PATENTS

| | | | |
|---|---|---|---|
| 2,957,785 | 10/1960 | Leatherland................ | 106/15 AF X |
| 3,222,158 | 12/1965 | Sowa .......................... | 106/15 AF X |

*Primary Examiner*—Lewis T. Jacobs
*Attorney, Agent, or Firm*—Curtis, Morris & Safford

[57] ABSTRACT

Anti-fouling paints containing tributyl tin oxide as the anti-fouling agent wherein said tributyl tin oxide is present in the paint with colloidal silicic acid produced by the flame hydrolysis of silicon tetrachloride and/or montmorillonite modified with a quaternary ammonium salt.

4 Claims, No Drawings

ANTI-FOULING PAINTS

The present invention relates to anti-fouling paints for discouraging the growth of marine organisms.

The hulls of vessels as well as structural parts of harbor and pier installations which are under water become overgrown in a relatively short time with marine organisms. These growths are of both plant and animal organisms such as barnacles, teredos, mussels, and algae.

On ocean vessels, this growth, particularly growths of barnacles, can reach such an extent that the frictional resistance of the hull is sharply increased and speed decreases. To compensate for the loss in speed, an increase in the amount of fuel consumed is required.

Further, many such growing organisms are capable of attacking the paint on the vessel hull, which can lead to considerable corrosion damage.

In each case, such an underwater growth involves great economic disadvantages and it is sought to discourage it as much as possible.

The growth-hindering properties of metallic copper have been recognized since early times. For this reason, wooden ships were coated with sheet copper beneath the water line. This process can be employed in ships having metal hulls because of the high degree of electrolytic corrosion.

Today, underwater growths are sought to be discouraged by the use of paints containing certain antifouling agents. This group of agents includes copper oxide, copper salts and arsenic salts, mercury compounds, or, also, chlorinated hydrocarbons such as hexachlorocyclohexane.

In particular, copper oxide ($Cu_2O$) is used in large quantities. However, this material has the disadvantage that it does not long retain its efficacy. Even after as short a period as a half year, growths occur and the paint must be replaced.

More recently, triorgano tin compounds have proved particularly effective as anti-fouling agents (cf. U.S. Pat. No. 3,426,473). These compounds permit the preparation of so-called "long-term" anti-fouling paints, some of which are effective for more than 2 years. Among these triorgano tin compounds, the most important are tributyl-and triphenyl-tin compounds.

One of the most effective organotin compounds of all is tributyl tin oxide. It is effective not only against barnacles but also against marine algae.

Unfortunately, this compound has a disadvantage that considerably limits its use: tributyl tin oxide, particularly in high concentrations, is incompatible with many paint carriers. Very sticky surfaces are formed and the adhesion of the paint is worsened.

In many cases, the paint properties are not influenced, nevertheless the tributyl tin oxide for the most part "sweats out" and then is rinsed off mechanically from the paint surface by water. The amounts of material remaining in the paint are no longer sufficient for an anti-fouling effect and after a short time growths occur.

The present invention provides anti-fouling paints containing tributyl tin oxide which do not show the aforementioned disadvantages and have a long term effect against marine organisms. According to the invention, paints containing tributyl tin oxide as an antifouling agent effective against harmful marine organisms have been prepared wherein tributyl tin oxide is employed in combination with colloidal silica gel obtained by the flame-hydrolysis of silicon tetrachloride or is combined with montmorillonites modified with quaternary amine salts.

The colloidal silicic acid is obtained according to a method known in the prior art by the flame hydrolysis of silicon tetrachloride. This material and its preparation are extensively discussed in the *Kirk-Othmer Encyclopedia of Chemical Technology*, 2nd Edition, Vol. 18, on pages 61 – 72, incorporated herein by reference. These colloidal silicic acids are commercially available and are widely used in the paint industry as thickening and thixotroping agents. Surprisingly, colloidal silicic acids prepared by techniques other than flame hydrolysis have not proved successful when used in the present invention although, superficially, the physical characteristics appear similarly. It is believed that the flame-hydrolyzed material is particularly successful because of its high degree of purity, i.e., about 99.8 $SiO_2$.

Montmorillonites, preferably magnesium montmorillonite, which are modified by quaternary ammonium salts are available in commerce as gelling or emulsifying agents. Such modified clays, characterized in the prior art as "complexes" or "cation-modified" clays, and their preparation, are taught in U.S. Pat. Nos. 2,531,396; 2,531,427; 2,531,440; 2,767,175; 2,767,176; 2,767,178; and 2,767,189, for instance. Paints containing such modified clays are described in U.S. Pat. No. 2,622,987. As the quaternary ammonium salt, a tetraalkyl material such as dimethyl-dioctadecyl ammonium salt can be employed, for example.

In the paints of the present invention, tributyl tin oxide is suitably incorporated into a paint vehicle, usually one comprising synthetic resin solids, in an amount which is from about 10 to about 80 percent, preferably from about 35 to about 75 percent, by weight of said solids.

The amounts of silicic acid or of modified montmorillonites necessary to obtain an effect according to the present invention are very small. Thus, they can be about 5 to about 50 percent, preferably from about 15 to about 35 percent, by weight of the tributyl tin oxide present. Mixtures of colloidal silicic acid and montmorillonite within this range are also encompassed within the scope of the invention.

The colloidal silicic acid or montmorillonite to be employed according to the invention can first be mixed with tributyl tin oxide and the combination then added to the paint vehicle. However, the colloidal silicic acid or montmorillonite can also be separately added to the paint vehicle.

Paints containing tributyl tin oxide and prepared with the aforementioned additives give exceptionable surfaces and adhere well to the most diverse substrates.

This effect of silicic acid obtained by the flame hydrolysis of tin tetrachloride or by the use of montmorillonite modified with quaternary ammonium salts is all the more surprising since it cannot be attained with other finely-divided adsorbing agents such as silica gel, bleaching earths, or other materials. Evidently, the effect described herein depends less on an adsorptive binding of the tributyl tin oxide on the preferred agents than on a specific effect of the silicon therein.

The tributyl tin oxide combinations according to the present invention can be used in the most diverse paint vehicles, for example in epoxy resin lacquers or also in polyacrylic resin or polyvinyl resin lacquers. Numerous typical formulations for antifouling paint vehicles containing such synthetic resins are described in "Formulation of Organic Coatings" by Norman I. Gaynes, D. Van Nostrand Company, Inc., Princeton, New Jersey (1967) on pages 338 et seq. Pigments, plasticizers, solvents, etc. conventionally used in such vehicles are also discussed. Further, U.S. Pat. Nos. 3,717,606; 3,337,352; 3,350,211; 3,677,777; and 3,702,256 also all disclose various antifouling paint vehicles into which the antifouling agents of the present invention can be incorporated.

The efficacy of the anti-fouling paint according to the present invention was tested in open water. For this purpose, steel plates coated with the paints to be tested after a prior priming were exposed to marine organisms in ocean water in the North Sea (Cuxhaven).

A better understanding of the present invention and of its many advantages will be had by referring to the following specific examples given by way of illustration.

EXAMPLE 1

28.7 parts by weight of a 75 percent solution (in xylene) of a solid epoxy resin prepared from diphenylol propane and epichlorohydrin and having an epoxy value of 0.2; 28.7 parts by weight of titanium dioxide; 0.1 part by weight of silicon oil; 2.9 parts by weight of tricresyl phosphate; 33.0 parts by weight of thinner (xylene: ethylene glycol monoethyl ether, 4:1); and 16.9 parts by weight of a mixture of 12.8 parts by weight of tributyl tin oxide and 4.1 parts by weight of colloidal silicic acid obtained by the flame hydrolysis process (available under the tradename "Aerosil") are milled in a ball mill. Subsequently, 16.1 parts by weight of a 60 percent solution (in xylene: butanol, 4:1) of a polyaminoamide adduct having an amine number of 125 and prepared from 52.5 parts by weight of a polyaminoamide and 7.5 parts by weight of the aforementioned epoxy resin are added. (The polyaminoamide is in turn prepared from dimerized tall oil fatty acid and triethylene tetramine and has an amine number of 240.)

The paint gives a completely dry and smooth surface.

The "Aerosil" material employed in this Example is extensively discussed in an article by Wagner et al. in Angew. Chem., No. 19/20, pages 744 – 750 (1960).

COMPARISON EXAMPLE TO EXAMPLE 1

A paint of the composition as in Example 1, but prepared without the colloidal silicic acid, gives a highly tacky surface after drying.

EXAMPLE 2

A paint composition comprising:
   36.7 parts by weight of the epoxy resin solution of Example 1;
   35.6 parts by weight of titanium dioxide;
   0.15 part by weight of silicon oil;
   2.9 parts by weight of tricresyl phosphate;
   37.5 parts by weight of the thinner of Example 1;
   14.8 parts by weight of a mixture of 23.0 parts by weight of tributyl tin oxide and 3.7 parts by weight of a montmorillonite modified with dimethyldioctadecyl ammonium salt (commercially available under the tradename "Bentone 27"); and
   11.0 parts by weight of a 70 percent solution (in xylene) of the polyaminoamide of Example 1
was prepared as in Example 1 and gave a dry and tack-free surface.

EXAMPLE 3

Paint composition:
   39.5 parts by weight of an acrylic resin (commercially available as "Paraloid P 10") (40 percent in gasoline);
   5.3 parts by weight of a polyvinyl chloridepolyvinyl acetate copolymer (commercially available under the tradename "Vinylite VAGH");
   38.0 parts by weight of titanium dioxide;
   8.3 parts by weight of xylene;
   32.1 parts by weight of methyl isobutyl ketone;
   11.0 parts by weight of tributyl tin oxide; and
   2.8 parts by weight of the colloidal silicic acid of Example 1.

After drying, the paint was completely tack-free.

EXAMPLE 4

Paint composition:
   21.0 parts by weight of a polyvinyl chloridepolyvinyl acetate copolymer ("Vinylite VYHH");
   39.0 parts by weight of titanium dioxide;
   12.0 parts by weight of xylene;
   48.0 parts by weight of methyl isobutyl ketone; and 18.3 parts by weight of a mixture of 15.8 parts by weight of tributyl tin oxide and 2.5 parts by weight of the colloidal silicic acid of Example 1.

After drying, the paint was completely tack-free.

COMPARISON EXAMPLE TO EXAMPLE 4

The composition of the paint vehicle was as in Example 4, but without addition of the colloidal silicic acid. After drying, the paint was tacky and after a few days tributyl tin oxide separated.

The results of the open water testing are reported below in Table I.

TABLE I

| Paint According to Example No. | Percent of Growth After | | | |
|---|---|---|---|---|
| | 4 | 12 | 16 | 24 Months |
| 1 | 0 | 0 | 5 | 5 |
| 2 | 0 | 0 | 0 | 0 |
| 3 | 0 | 0 | 0 | 0 |
| 4 | 0 | 0 | 0 | 0 |
| Comparison (Example 1) | 80 | 100 | 100 | 100 |
| Comparison (Example 4) | 70 | Cracking off of the paint | | |

After 24 months, all paints according to the present invention were practically uncovered with growth and suffered no paint damage.

The paints according to Comparison Examples 1 and 4, which did not contain the combinations of the present invention, were heavily covered with barnacles after only four months' exposure to the ocean. The paint of Comparison Example 4 in addition showed poor adhesion. After 12 months' exposure it had largely cracked off.

What is claimed is:

1. In an anti-fouling paint comprising tributyl tin oxide as the anti-fouling agent present in a paint vehicle, the improvement wherein said tributyl tin oxide is present in combination with from about 5 to about 50 percent, by weight of said tributyl tin oxide, of at least one member selected from the group consisting of colloidal silicic acid prepared by the flame hydrolysis of silicon tetrachloride and montmorillonite modified with a quaternary amine salt.

2. An anti-fouling paint as in claim 1 wherein said member is present in an amount from about 15 to about 35 percent by weight of said tributyl tin oxide.

3. An anti-fouling paint as in claim 1 wherein said tributyl tin oxide is present in combination with said colloidal silicic acid prepared by the flame hydrolysis of silicon tetrachloride.

4. An anti-fouling paint as in claim 1 wherein said tributyl tin oxide is present in combination with said montmorillonite modified with a quaternary amine salt.

* * * * *